United States Patent [19]
Jakobi et al.

[11] Patent Number: 5,518,305
[45] Date of Patent: May 21, 1996

[54] VACUUM BRAKE POWER BOOSTER

[75] Inventors: Ralf Jakobi, Florsheim; Kai-Michael Graichen, Langen, both of Germany

[73] Assignee: ITT Automotive Europe GmbH, Germany

[21] Appl. No.: 373,321

[22] Filed: Mar. 15, 1995

[30] Foreign Application Priority Data

May 26, 1993 [DE] Germany ............... 43 17 490.6

[51] Int. Cl.⁶ ............... B60T 8/18; B60T 13/52; B60T 8/44; F15B 9/10
[52] U.S. Cl. ............... 303/114.3; 91/369.2; 91/376 R; 188/356; 303/198; 303/22.1; 303/113.4
[58] Field of Search ............... 188/356, 357, 188/195; 303/113.4, 113.3, 100, 114.3, 114.1, 114.2, 22.1, 127, 125, 139, 198; 91/369.2, 376 R, 369.1, 372, 386

[56] References Cited

U.S. PATENT DOCUMENTS

| | | | |
|---|---|---|---|
| 4,917,000 | 4/1990 | Fecher | 91/369.2 |
| 5,293,808 | 3/1994 | Rueffer et al. | 91/369.2 |
| 5,350,224 | 9/1994 | Nell et al. | 91/376 R X |

FOREIGN PATENT DOCUMENTS

| | | |
|---|---|---|
| 4208384 | 9/1993 | Germany . |
| 59-227554 | 12/1984 | Japan ............... 91/369.2 |

OTHER PUBLICATIONS

International Search Report for Application PCT/EP/9401666 filed May 24, 1994.

Primary Examiner—Douglas C. Butler
Attorney, Agent, or Firm—Dkyema Gossett

[57] ABSTRACT

To infinitely variably adjust the distance between a reaction disc and an interacting second part of a bipartite valve piston in a completely assembled vacuum brake power booster, which is already mounted to the automotive vehicle, a tubular sleeve is provided, arranged coaxially to a piston rod that actuates the valve piston, and is in engagement with a first part of the valve piston, connected with the second part by a threaded union, to apply a torque to the first piston part. For this purpose, the sleeve has at its end projecting from the control housing with an extension permitting rotation of the sleeve.

7 Claims, 2 Drawing Sheets

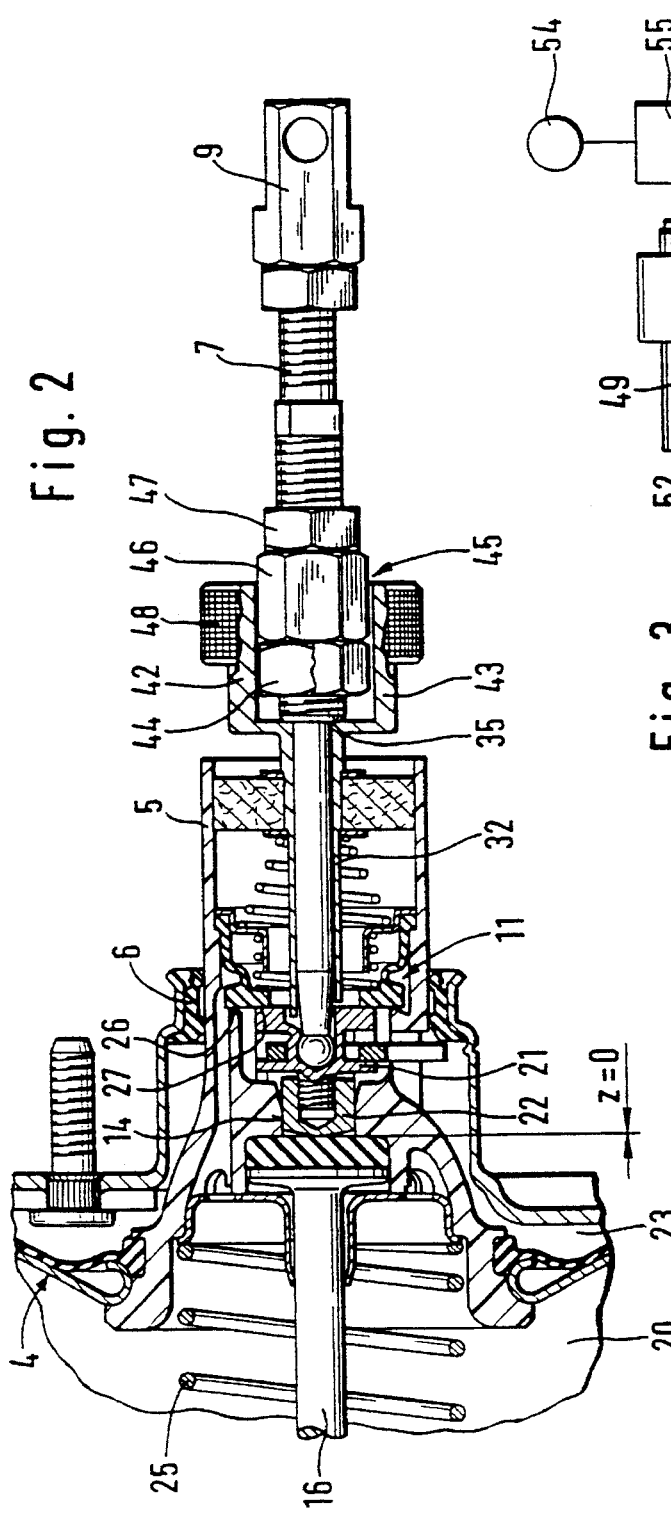
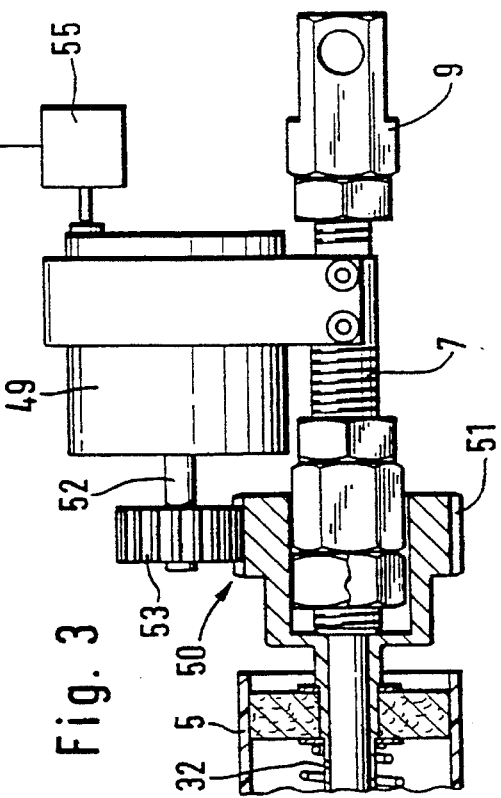
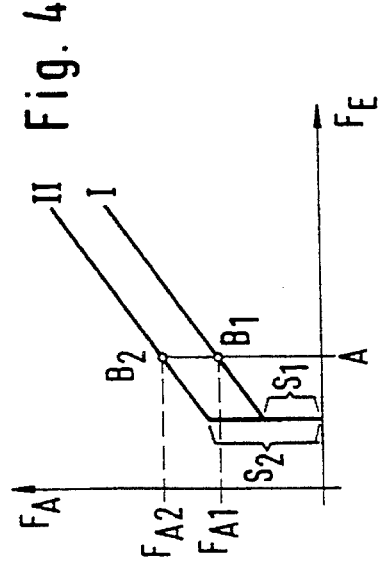

5,518,305

VACUUM BRAKE POWER BOOSTER

BACKGROUND OF THE INVENTION

The present invention relates to a vacuum brake power booster including a booster housing which is sealingly subdivided by an axially movable wall into a vacuum chamber and a power chamber. The axially moveable wall is subjectible to a pneumatic pressure differential. A control valve, which controls the pressure differential, is accommodated within a control housing and actuatable by a valve piston. The valve piston is slidable by means of a piston rod and in a force-transmitting connection with a force-delivering member, such as a push rod, through an elastic reaction disc. The valve piston is composed of a first piston part which interacts with the piston rod and is rotatably supported within the control housing, and a second piston part which is guided within the control housing so as to be secured against rotation and is in abutment against the reaction disc. The two piston parts are coupled to each other by means of a threaded union so as to be movable in respect of each other within limits in an axial direction. A tubular sleeve, which is arranged coaxially to the piston rod, is in engagement with the first piston part.

In series manufacture of vacuum brake power boosters of this type, it is necessary to adjust the distance between the reaction disc and the second piston part as exactly as possible. The distance is typically referred to as the parameter z. The exact adjustment is needed in order to obtain the characteristic curves required by the automobile industry. The parameter z to be adjusted determines the behavior of the booster in the initial phase of its actuation. In particular the extent of the abrupt rise of the output force when actuated with a predetermined input force (i.e., the jumper effect) depends on the parameter z.

In an adjustable vacuum brake power booster as disclosed in DE-OS 42 08 384, the adjustment of the desired parameter z is carried out by means of a sleeve, which is arranged coaxially to the piston rod and is in permanent engagement with the first piston part. The sleeve is secured against rotation due to its positive engagement with the control housing after the adjusting operation is terminated. The anti-rotation mechanism is preferably effected by a circlip which is slipped onto the sleeve and the radial projections of which engage into grooves provided on the inner circumference of the control housing. Subsequently, the circlip is retained by the fringe area of an elastic protective cap which protects the control housing, which fringe area is coupled to a circumferential groove in the sleeve.

The disadvantage in the above referenced adjustable vacuum brake power booster is that variation of the adjusted parameter z within the automotive vehicle is not possible.

Therefore, an object of the present invention is to make provisions in a vacuum brake power booster of the type previously mentioned which allow infinitely variably adjusting the adjusted parameter z when the booster is in the completely assembled condition and fitted to the automotive vehicle.

This object is achieved, according to the present invention, by the sleeve having an extension at its end projecting from the control housing which allows rotation of the sleeve.

Preferred embodiments of the present invention are described in the following description of two preferred embodiments making reference to the accompanying drawings.

BRIEF DESCRIPTION OF THE DRAWINGS

FIG. 2 is a view of the vacuum brake power booster of FIG. 1 after an adjustment operation.

FIG. 3 is a partial sectional view of selected portions of a second embodiment of the subject matter of the present invention.

FIG. 4 is a diagrammatic representation of the dependency of the output force on the input force of the vacuum brake power booster according to the present invention.

DETAILED DESCRIPTION OF THE PREFERRED EMBODIMENTS

Figure 1:
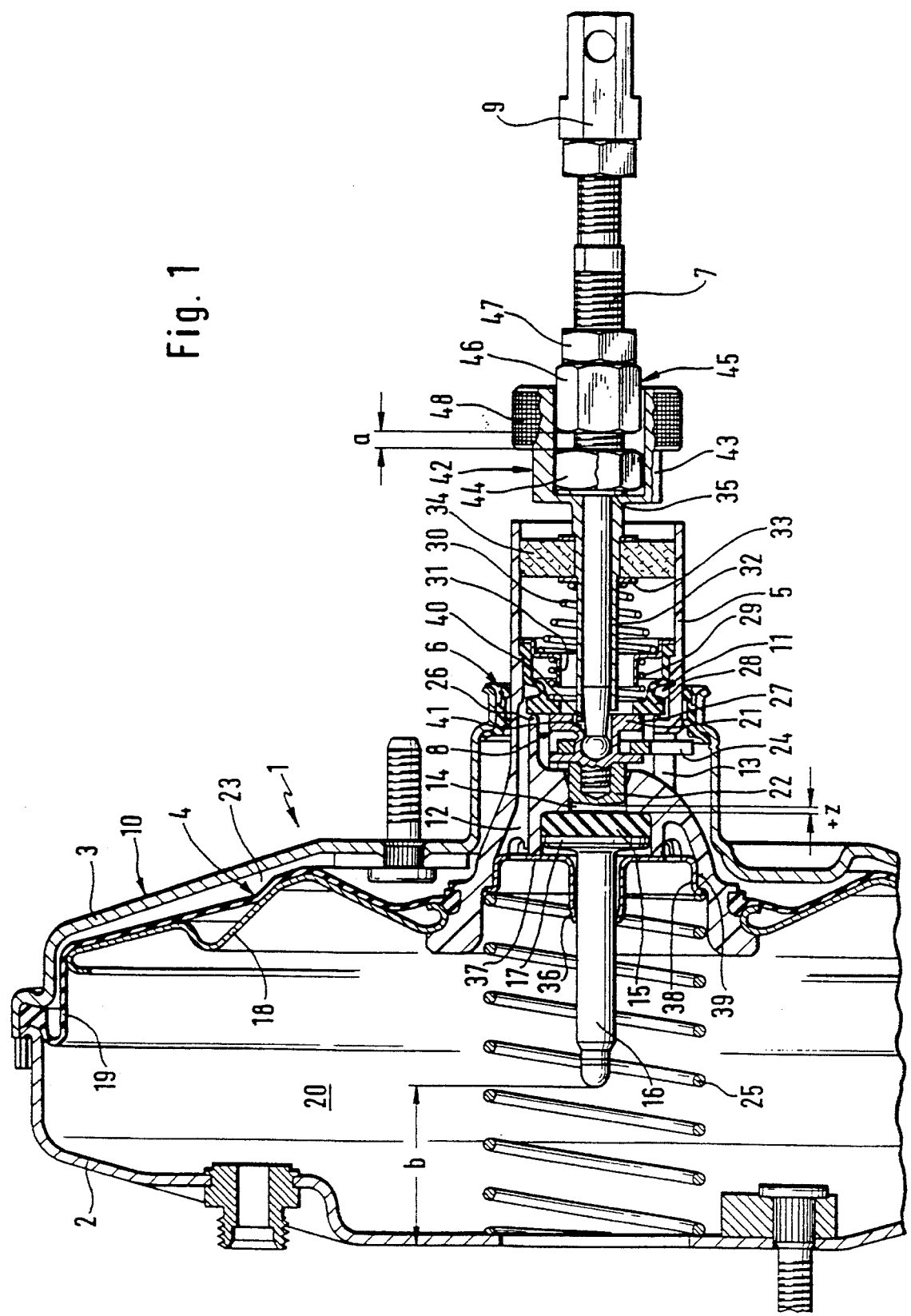
FIG. 1 is an axial sectional view of a vacuum brake power booster according to the present invention in an initial position.

The booster housing 10 of the vacuum brake power booster 1 according to the present invention, as shown in FIG. 1, is composed of two housing parts 2, 3 being engaged with each other in a coupling plane by means of indentations. The interior space of the booster housing 10 is subdivided by a movable wall 4 into a vacuum chamber 20, which is connected to a conventional vacuum source (not shown) through a pneumatic connection, and a power chamber 23.

The movable wall 4, which is formed by a metal diaphragm disc 18 and by a rolling diaphragm 19 abutted against the diaphragm disc in the power chamber 23, is fixed to a control housing 5 which seals off the power chamber 23 towards the outside with a sliding guide ring 6.

In the interior space of the control housing 5, a control rod composed of a piston rod 7 and a valve piston 8 is disposed so as to be axially slidable. The control rod is connectible to a brake pedal of an automotive vehicle through a forkhead 9. Control housing 5 accommodates, further, a control valve 11 which is actuated by the valve piston 8 and controls the pressure differential between the vacuum chamber 20 and the power chamber 23 through air guide ducts 12, 13. In addition, the control housing 5 has a stepped bore 14. A reaction disc 15 and a head flange 17 of a push rod 16 are accommodated within a large-diameter section of stepped bore 14. The push rod 16 actuates a master brake cylinder (not shown) which is fixed to the front side of the booster housing 10 in a conventional manner.

For the return of the movable wall 4, a return spring 25 is provided which is compressed in between the control housing 5 and the bottom 2 of the booster housing 10.

In this configuration, the valve piston 8 which, in the release position, abuts against the sliding guide ring 6 through a transverse member 24, is preferably configured in two parts. A first piston part 21, is coupled to the piston rod 7, and a second piston part 22. Second piston part 22 is connected to the first piston part 21 by means of a threaded union which is positioned within a second, small-diameter section of the stepped bore 14 so as to be secured against rotation and to be guided in a radial direction and slidable in an axial direction. The surface of the second piston part in contact with the reaction disc 15 determines the ratio of the power brake unit. The distance z between the second piston part 22 and the reaction disc 15 constitutes a functionally important parameter of the brake power booster, whose significance will be explained in more detail in the following text.

The control assembly of the vacuum brake power booster is illustrated in the stand-by position, that is, in a position in which the two chambers 20, 23 are separated from each other. In this position, both sealing seats 26, 27 of the control valve 11 are abutted against the sealing surface of a popper valve 28 which is prestresaed in the direction of the two sealing seats 26, 27 by means of a popper valve spring 29. Sealing seat 27 which is provided at the first piston part 21 is urged against the popper valve 28 by a piston rod return spring 30. The piston rod return spring 30 is supported, at one end, at a sleeve-shaped popper valve holder 31, at which, additionally, the popper valve spring 29 is supported. At its other end, the piston rod return spring 30 is supported at an annular disc 33 of a tubular sleeve 32, which is positioned coaxially with the piston rod 7. Tubular sleeve 32 is in engagement with the first piston part 21, on the one hand, and in axial abutment against a stop 35 on the piston rod 7, on the other hand. The annular disc 33 serves as an abutment means for an air filter 34 positioned in the suction range of the control housing 5.

In order to precisely guide the push rod 16, a guide sleeve 36 is provided. A radial flange 37 of guide sleeve 36 is supported at the control housing 5 and passes over into cylindrical guide surface 38 interacting with a cylindrical section 39, configured at the control housing 5, so that the bending forces acting on push rod 16 are efficiently absorbed. The radial flange 37, which is furnished with a plurality of openings in the range of the mouth of the air guide duct 12, is secured against falling-out by the return spring 25 which is supported at a radial collar succeeding the cylindrical guide surface 38.

To transmit a torque to the first piston part 21, sleeve 32 has two preferably radially oppositely arranged projections or noses 40 at its end close to the valve piston 21. Noses 40 are adapted to be inserted into recesses or indentations 41 in the first piston part 21, of which only one projection and one recess are shown in the drawing. To transmit the previously mentioned torque, which is necessary to adjust the parameter z, to the sleeve 32, the sleeve has an extension 42 at its end remote from the valve piston 8. Extension 42 passes over into a radially enlarged portion 43, the cylindrical surface of which is provided with a milled brim 48 so that manual adjustment and rotation of the sleeve 32 are easily possible. Preferably, the enlarged portion 43 accommodates a means for limiting the adjustment travel which includes a check nut 44, arranged on the piston rod 7 so as to be adjustable within limits in an axial direction, and a stop 45, which is arranged on the piston rod 7 so as to be movable within limits in an axial direction. In the illustrated example, the stop 45 is a stop nut 45 screwed to the piston rod 7, and the position of the stop nut can be secured by a counter nut 47.

Referring now to FIG. 2, for purposes of this discussion z=0 in the illustration. When adjusting the desired distance z, the basis is an initial position in which the second piston part 22 is at a distance+z>0 (FIG. 1) from the reaction disc 15, which distance corresponds to a major jumper effect, and abuts with its other end on the first piston part 21 so that the sleeve 32 may be rotated in one direction only. The check nut 44 is at a distance (a, see FIG. 1) from the stop nut 46. After the evacuation of the booster housing 10 of the vacuum brake power booster according to the present invention, a predetermined distance (b) is adjusted between a reference surface (such as the surface of the front housing half 2) and the end of the push rod 16. Next, sleeve 32 is turned, while the mentioned distance (b) is simultaneously measured, so long until an admissible bottom limit of the distance is reached. Rotation of the sleeve 32 in a counter-clockwise direction (as illustrated) makes the bipartite valve piston 8 longer and, thus, the parameter z smaller. Subsequently, the lock nut 46 is moved into abutment against the check nut 44 and fixed or secured in this end position by means of the counter nut 47. However, the adjusted parameter z is infinitely adjustable at any time in the range between the two end positions so that it is possible, for example, to exactly adjust the magnitude of the jumper effect, as defined by vehicle manufacturers, upon replacement of the brake master cylinder (not shown) which is typically inserted after the brake power booster. Further, the present invention may be utilized in determining the optimal magnitude of the jumper effect. Thus, the brake system of a vehicle may be tested with different jumper effects within the shortest possible time.

In the embodiment shown in FIG. 3, an electric motor 49 is used to adjust the sleeve 32 which may be arranged on the piston rod 7, for example, and drives the sleeve 32 by means of a schematically illustrated gear unit 50. It is expedient in the embodiment shown that the extension 42 and the radially enlarged portion 43 of the sleeve 32 preferably are provided with a toothing 51 interacting with a pinion 53, positioned on the electric motor shaft 52, and, thus, are part of the mentioned gear unit 50. However, it is also possible to arrange the electric motor coaxially relative to the sleeve 32 to drive the sleeve 32 directly, without the intermediary of the gear unit.

It is also preferable in an electromotive drive of the sleeve 32 to actuate the electric motor 49 in response to the load condition of the vehicle. For this purpose, the vehicle is equipped with a load sensor 54 for sensing the load of the vehicle (FIG. 3). The output signals of the load sensor 54 are furnished to evaluating electronics 55 that responsively produce control signals to actuate the electric motor 49.

If the load sensor measures a small load on the vehicle, a small parameter z, which corresponds to the inferior jumper effect $S_1$ shown in FIG. 4, is adjusted in an electronically controlled manner. However, if the load sensor 54 measures a heavier load on the vehicle, a superior jumper effect $S_2$ will be adjusted. It is achieved thereby that, with an actuating force (A) and with a vehicle subjected to small load, the output force $F_{A1}$ which corresponds to point $B_1$ in the first characteristics curve I is generated by the brake power booster. With a more heavily loaded vehicle and with the same amount of actuating force (A), an output force $F_{A2}$ which corresponds to point $B_2$ in the illustrated characteristics curve II, is generated. Due to the variation of the magnitude of the jumper effect, an effect is achieved which corresponds to a variable transmission of the apparatus. Thus, the same degree of deceleration may be produced irrespective of the load and with almost the same actuating force. It is also possible, without departing from the idea of the present invention, to actuate the electric motor 49 in an electronically controlled manner, in response to the magnitude of the Jumper effect.

We claim:
1. A vacuum brake power booster comprising:
  a booster housing which is sealingly subdivided by an axially moveable wall into a vacuum chamber and a power chamber, said moveable wall being subjectable to a pneumatic pressure differential;
  a control valve which controls the pressure differential and is accommodated within a control housing, said control valve being actuatable by a valve piston, which is slidable by means of a piston rod and is in a force-transmitting connection with a force-delivering member through an elastic reaction disk;

said valve piston further comprising a first piston part, which interacts with the piston rod and is rotatably supported within the control housing, and a second piston part, which is guided within the control housing so as to be secured against rotation and is in abutment against the reaction disk, said first and second piston parts being coupled to each other by means of a threaded union so as to be moveable relative to each other within limits in an axial direction:

a tubular sleeve which is arranged coaxially to the piston rod being in engagement with the first piston part, and wherein said sleeve has an extension at its end projecting from the control housing which permits rotation of the sleeve, further wherein said sleeve has a radially enlarged portion at its end, said portion receiving means for limiting the range of adjustment.

2. A vacuum brake power booster as claimed in claim 1, wherein said limiting means comprises a check nut which is arranged on the piston rod so as to be adjustable within limits in an axial direction and which interacts with a stop provided on the piston rod.

3. A vacuum brake power booster as claimed in claim 2, wherein said stop is provided on the piston rod so as to be axially adjustable, said stop comprising a stop nut which is secured against axial re-adjustment by a counter nut.

4. A vacuum brake power booster as claimed in claim 1, wherein said enlarged portion is part of a gear unit positioned between the sleeve and the electric motor.

5. A vacuum brake power booster assembly for use in a vehicle brake system for infinitely varying a control parameter within the brake system after the brake system is assembled and mounted on the vehicle, comprising:

an assembly housing:

a slidable valve piston supported within said assembly housing, said valve piston having a first piston part, coupled to a piston rod for moving said valve piston in an axial direction, said first piston part being rotatable relative to said assembly housing, and a second piston part that is threadedly coupled to said first piston part, said second piston part being rotatable fixed relative to said assembly housing: said first and second parts being relatively moveable such that an axial distance between said first and second parts is infinitely variable within preselected limits: and a sleeve arranged coaxially about said piston rod and engaging said first piston part at a first end of said sleeve, said sleeve having an extension at a second end projecting outside of said assembly housing for permitting rotation of said sleeve to thereby adjust said axial distance between said first and second piston parts, wherein said sleeve has a radially enlarged portion at said second end, and wherein said radially enlarged portion cooperates with a limiting member that limits a range of rotation of said sleeve.

6. The vacuum brake power booster of claim 5, wherein said limiting member comprises a check nut which is arranged on said piston rod such that said nut is adjustable within preselected limits in an axial direction, said check nut interacting with a stop provided on said piston rod.

7. The vacuum brake power booster of claim 6, wherein said stop comprises a stop nut that is adjustable on said piston rod and further comprising a counter nut for securing said stop nut in a preselected axial position relative to said assembly housing.

* * * * *